Feb. 28, 1939.  H. A. BEEKHUIS, JR  2,148,429
PRODUCTION OF ALKALI AND ALKALINE EARTH METAL NITRATES
Filed Aug. 12, 1933
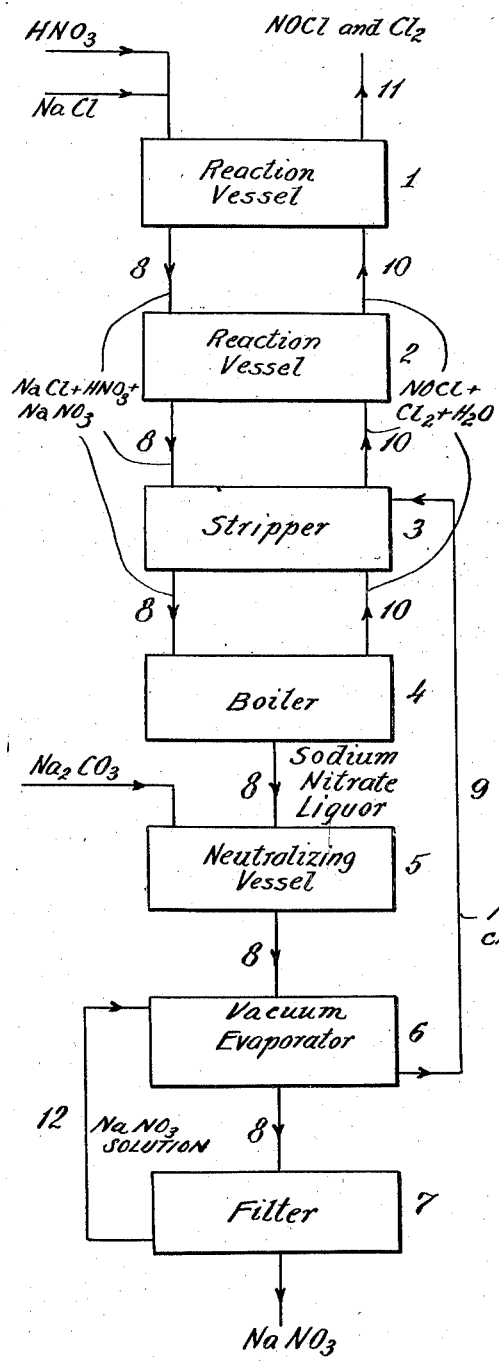
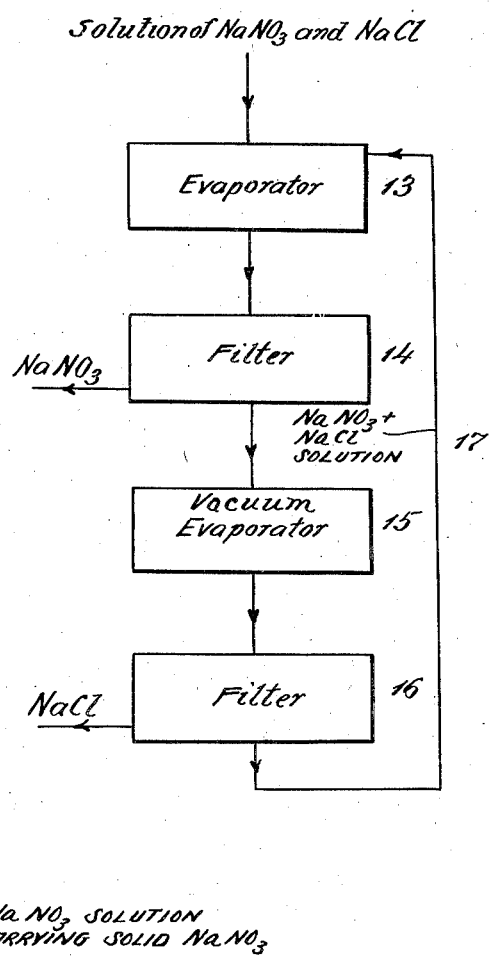
INVENTOR
Herman A. Beekhuis, Jr.
BY
ATTORNEYS

UNITED STATES PATENT OFFICE 2,148,429

PRODUCTION OF ALKALI AND ALKALINE EARTH METAL NITRATES

Herman Albert Beekhuis, Jr., Petersburg, Va., assignor, by mesne assignments, to The Solvay Process Company, New York, N. Y., a corporation of New York Application August 12, 1933, Serial No. 684,829

19 Claims. (Cl. 23—102)

This invention relates to a process and apparatus for the production of nitrates of the alkali or alkaline earth metals. More particularly, the invention relates to a process for the production of a nitrate by the reaction of nitric acid with an alkali metal chloride or alkaline earth metal chloride to form the nitrate of the corresponding metal and gaseous reaction products, principally nitrosyl chloride (NOCl) and chlorine. Sodium nitrate, potassium nitrate and calcium nitrate are examples of alkali metal or alkaline earth metal nitrates which may be prepared in accordance with the process of this invention from nitric acid and sodium chloride, potassium chloride, or calcium chloride, respectively.

It is known that nitric acid reacts with sodium chloride, for example, to form sodium nitrate. The process by which sodium nitrate may be thus formed may involve the reaction expressed by the following equation:

I. $NaCl + HNO_3 = NaNO_3 + HCl$

In the above reaction the products are sodium nitrate and hydrochloric acid. Sodium chloride and nitric acid may also react to form sodium nitrate as expressed by the equation:

II. $3NaCl + 4HNO_3 = 3NaNO_3 + NOCl + Cl_2 + 2H_2O$

The products of this reaction are sodium nitrate and a gaseous mixture of nitrosyl chloride and chlorine containing more or less water vapor depending upon the temperature at which the gaseous products of the reaction are saturated in contact with the solutions in which the reaction is carried out.

When a reaction mixture containing sodium chloride and nitric acid is prepared and treated for the formation of sodium nitrate the course of the reaction, i. e., whether it takes place as shown by Equation I or Equation II above, depends upon the conditions of treating the materials, such as concentration of nitric acid and proportions of acid and sodium chloride in the reaction mixture, the temperature to which the reaction mixture is heated, etc. In general the use of more concentrated nitric acid and of higher temperatures favor the formation of nitrosyl chloride and chlorine by the reaction of Equation II.

It is an object of this invention to provide a process for the production of a nitrate from nitric acid and an alkali metal or alkaline earth metal chloride which favors the formation of nitrosyl chloride and chlorine in addition to the alkali metal or alkaline earth metal nitrate, which makes possible a substantially complete utilization of the nitric acid and chloride entering into the process, while limiting the quantities of solution which must be processed for the recovery of a given amount of nitrate, and which provides an economical method for the recovery of a satisfactory nitrate product from the process.

In making a nitrate in accordance with the process of this invention a reaction mixture prepared from nitric acid of a concentration above about 40% $HNO_3$ and an alkali metal or alkaline earth metal chloride is heated at temperatures above about 50° C. while passing in direct contact with the reaction mixture a gas having a lower partial pressure of the gaseous products of the reaction (nitrosyl chloride and chlorine) than the heated reaction mixture itself. The gas passed in contact with the reaction mixture is preferably steam obtained by boiling the nitrate solution resulting from the reaction between the chloride and nitric acid. The steam, containing a relatively small proportion of nitrosyl chloride and chlorine, is passed in contact with fresh quantities of a mixture prepared from nitric acid and an alkali metal or alkaline earth metal chloride. The heating of the reaction mixture may be accomplished by means of heat contained in the steam and liberated in the reaction mixture by condensation of steam introduced thereinto. Thus, a mixture of nitric acid and chloride is heated at progressively higher temperatures through a range of from, for example, above 50° C. to boiling while passing the gases evolved at the higher temperatures in contact with the mixture at the lower temperatures. In making up the reaction mixture it is preferred to mix an excess of solid chloride with nitric acid of a concentration of 40% $HNO_3$ or higher. By "excess" of alkali metal chloride is meant an amount greater than that required to form a saturated solution with the nitric acid, but insufficient to react with all of the nitric acid in accordance with Equation II above. Thus, the reaction mixture as originally made up, is preferably a suspension of solid sodium chloride, for example, in a solution of sodium chloride in nitric acid. After reaction of the sodium chloride and nitric acid a clear liquor containing sodium nitrate, unreacted nitric acid and a minor quantity of sodium chloride is obtained.

The reaction mixture should contain more than sufficient nitric acid to react with all the chloride and the heating of the mixture of nitric acid and alkali metal or alkaline earth metal chloride is preferably continued until the resulting solution of nitrate contains no more free nitric acid than corresponds to a 7-normal (7-N) solution. This nitrate solution containing nitric acid is neutralized by addition of sodium or potassium hydroxide or carbonate, milk of lime or calcium carbonate, in amount sufficient to neutralize the free acid in the solution. The substantially neutral solution may then be concentrated, and solid alkali metal or alkaline earth metal nitrate recovered from the concentrated solution. The mother liquor containing nitrate and some undecomposed chloride may be returned and mixed with fresh quantities of nitric acid and chloride to be reacted in the manner described, or the mother liquor may be introduced into the nitrate solution being boiled as described above to provide steam for passage in contact with the reaction mixture of nitric acid and alkali metal or alkaline earth metal chloride. In either case, by returning mother liquor to liquor being processed at a point of the process such that after introducing into the reaction mixture the returned mother liquor the mixture is heated to temperatures promoting the reaction of nitric acid and alkali metal or alkaline earth metal chloride, the chloride in the mother liquor is reacted with nitric acid so that substantially all of the chloride introduced into the process may be recovered as the nitrate.

It is also advantageous to introduce alkali metal or alkaline earth metal nitrate into the reaction mixture by the return of mother liquor from the crystallization step, and even to introduce into the reaction mixture additional solid nitrate so that in at least the last stage of the process in which the reaction mixture is heated to temperatures promoting the formation of the nitrate, the mixture is substantially saturated with alkali metal or alkaline earth metal nitrate. While it would be expected from a theoretical standpoint that the addition of alkali metal or alkaline earth metal nitrate to the reaction mixture containing nitric acid and chloride would have an unfavorable action on the completeness of the reaction, by thus adding preformed alkali metal or alkaline earth metal nitrate even up to the point where the solution is saturated at 100–115° C. with respect to the nitrate, the completeness with which the chloride may be converted into the nitrate is increased. It is particularly of advantage to thus introduce into the reaction mixture preformed nitrate when employing for the decomposition of the chloride a nitric acid of relatively low concentration as, for example, a nitric acid containing 40% $HNO_3$.

This invention also includes an improvement in the method for recovering an alkali metal nitrate from solutions containing this substance together with a minor proportion of undecomposed alkali metal chloride, particularly as obtained in the above described method for reacting alkali metal chloride with nitric acid to form the alkali metal nitrate. It has been found that a relatively pure crystalline alkali metal nitrate may be recovered from such solutions by concentrating the solution under a pressure below atmospheric such as, for example, a pressure of about 1/10th of an atmosphere, and recovering from the solution the crystalline alkali metal nitrate which separates out until the solution is substantially saturated with alkali metal chloride. At this point, by increasing the pressure to, for example, one atmosphere, and continuing to evaporate the solution at the higher pressure, alkali metal chloride substantially free from alkali metal nitrate may be crystallized out and separated from the mother liquor until the solution becomes substantially saturated with alkali metal nitrate, whereupon the evaporation is continued at the lower pressure to recover alkali metal nitrate substantially free from chloride. By thus alternately evaporating the solution at a lower and then at a higher pressure, which requires the use of first a lower and then a higher temperature for heating the solution, substantially all of its content of alkali metal nitrate and chloride may be separately recovered as the solid. The alkali metal chloride and as much of the alkali metal nitrate as is desired may be employed in making up a reaction mixture containing nitric acid and alkali metal chloride for the production of additional quantities of alkali metal nitrate. Similar results may be obtained without the use of reduced pressure in evaporating the solution to crystallize out the nitrate, by passing a gas such as air in contact with the solution heated to a temperature below its boiling point at atmospheric pressure. The solution may then be concentrated at one temperature to crystallize out the nitrate, and then concentrated at a higher temperature, by boiling it under atmospheric pressure, for example, to crystallize out the chloride.

A preferred process for the production of sodium nitrate in accordance with this invention is illustrated in Fig. 1 of the accompanying drawing. Fig. 2 shows a modification of the method illustrated in Fig. 1 for recovering sodium nitrate from solution, in which modification sodium chloride is also recovered from the solution.

Referring to Fig. 1, there are diagrammatically shown two reaction vessels 1 and 2 respectively, a stripper 3, a boiler 4, neutralizing vessels 5, evaporator 6 and filter 7. The apparatus includes a plurality of pipes arranged for passing a slurry formed from nitric acid and sodium chloride and the reaction product obtained from this slurry through each of the aforementioned elements in series and in the order stated above. These pipes are numbered 8 in the drawing. Means are provided for preparing this slurry from nitric acid and sodium chloride and introducing it into reaction vessel 1 and also for introducing soda ash into neutralizing vessel 5. A pipe 9 serves to convey mother liquor from the evaporator 6 and introduce it into the reaction mixture being treated in stripper 3. A plurality of pipes 10 serve for conducting steam and gaseous products of the reaction of the nitric acid and sodium chloride from boiler 4 into stripper 3 where the vapors are directly contacting with the reaction mixture in the stripper, and for passing the vapors evolved from the reaction mixture in stripper 3 through reaction vessels 2 and 1 in series and in contact with the reaction mixture in each of these vessels. A pipe 11 serves to convey the gaseous products of the reaction from vessel 1 and convey them to any desired means not shown on the drawing for utilizing or treating the mixture containing nitrosyl chloride and chlorine thus obtained.

About 250 parts by weight of nitric acid containing about 50% $HNO_3$ and about 70 parts of a solid, relatively dry sodium chloride are mixed to form a slurry which is passed consecutively through reaction vessels 1 and 2, stripper 3 and boiler 4, by means of pipes 8 connecting these elements of the apparatus. Heat is applied to boiler 4 to boil the liquid therein and the steam is passed into stripper 3 and vessels 2 and 1 in series. It is preferred to supply all of the heat required for maintaining the materials in the reaction vessels and stripper at the desired temperature by the heating of boiler 4 to supply steam for passage to the stripper and reaction vessels. By thus operating excessive corrosion of heating surfaces is avoided and the solution in the stripper is substantially freed of gaseous products of the reaction. The application of heat to boiler 4 is at such a rate as to maintain a temperature of about 60° C. in reaction vessel 1, under which conditions reaction vessel 2 may be maintained at a temperature of about 100° C., and stripper 3 at a temperature of about 115° C., with the solution in boiler 4 being heated to boil it under ordinary atmospheric pressure at about 115° C. The steam evolved from the solution in the boiler contains low concentrations of nitrosyl chloride and chlorine, and some nitric and hydrochloric acid. The vapors from the stripper, reaction vessel 2 and reaction vessel 1 contain progressively increasing proportions of nitrosyl chloride and chlorine with the vapors from reaction vessel 1 consisting principally of nitrosyl chloride and chlorine saturated with water vapor at the temperature of operation of reaction vessel 1. The sodium chloride and nitric acid are supplied to reaction vessel 1 at rates such that the concentration of nitric acid in the solution boiled in boiler 4 remains below about that corresponding to a 7-N nitric acid solution. For example, the solution withdrawn from boiler 4 may have approximately the following composition:

|  | Parts |
|---|---|
| NaO$_3$ | 124½ |
| HNO$_3$ | 25 |
| NaCl | 4 |
| H$_2$O | 161½ |

The solution containing sodium nitrate and undecomposed nitric acid and sodium chloride may be continuously withdrawn from boiler 4 and passed to neutralizer 5 where it is mixed with sufficient sodium carbonate or sodium hydroxide to neutralize the free acid in the liquor. The substantially neutral liquor is then evaporated in evaporator 6 to crystallize sodium nitrate, which is seperated from the mother liquor by means of filter 7. Mother liquor, which may contain a portion of the crystallized sodium nitrate, may be withdrawn from evaporator 6 and returned to stripper 3 through pipe 9. The rest of the slurry of crystalline sodium nitrate and mother liquor may be passed from evaporator 6 to filter 7 where the mother liquor is separated from the sodium nitrate. The mother liquor from filter 7 may be returned to evaporator 6 through a pipe 12. If desired, instead of returning mother liquor from evaporator 6 to stripper 3 the mother liquor from filter 7 may be returned to stripper 3 together with any desired proportion of the solid sodium nitrate recovered in filter 7.

A modification of the procedure for the treatment of liquor from neutralizer 5 is illustrated in Fig. 2 which shows an apparatus comprising an evaporator 13 arranged for operation at a pressure of, for example, 1/10th of an atmosphere, a second evaporator 14 for operation at a higher pressure and two filters 15 and 16.

In employing the process illustrated in Fig. 2 for the treatment of solution from a neutralizing vessel such as 5 of Fig. 1, the solution is introduced into evaporator 13 where it is boiled under a reduced pressure (preferably 1/10th of an atmosphere) to crystallize out sodium nitrate until the liquor is substantially saturated with sodium chloride. This mixture of crystalline sodium nitrate and mother liquor is passed to filter 14 where the sodium nitrate is recovered and the mother liquor is introduced into evaporator 15 where evaporation is continued under a higher pressure of about 1 atmosphere, for example. Sodium chloride crystallizes from the solution in evaporator 15 and when the mother liquor becomes substantially saturated with sodium nitrate, it is withdrawn to filter 16 where the crystallized sodium chloride is separated from the mother liquor. The mother liquor may be returned through a pipe 17 to evaporator 12 and mingled with solution coming from the neutralizing vessel and may be further evaporated for the recovery of additional quantities of sodium nitrate.

While the foregoing describes an example of the process for the production of sodium nitrate in accordance with this invention, it is illustrative only of the invention and the invention is not limited to the particular method or conditions of operation of this example. In making up the reaction mixtures a nitric acid having a concentration of not less than about 40% HNO$_3$, and preferably a nitric acid within the range of from 40% to 60% HNO$_3$ may be employed. Substantially dry sodium chloride or moist sodium chloride containing say up to 5% water and more may be mixed with the nitric acid. When water is added to the reaction mixture other than that contained in the nitric acid, for example when a moist or wet sodium chloride is employed, it is preferred to use a nitric acid of a concentration sufficiently above 40% HNO$_3$ that the reaction mixture as originally prepared contains nitric acid of a concentration above about 40% HNO$_3$ based on the HNO$_3$ and total water content of the mixture.

Instead of employing a plurality of separate vessels in which the reaction mixture is heated to progressively higher temperatures, the functions of the four vessels 1, 2, 3 and 4 shown in the drawing may be performed by a single vessel such as a tower containing bubbling plates and provided with a heater in the bottom portion. In employing such an apparatus the reaction mixture is passed downwardly through the tower and the evolved gases are passed upwardly in countercurrent flow with the reaction mixture. The resulting solution of sodium nitrate, potassium nitrate or calcium nitrate is boiled in the bottom of the tower and the steam passed upwardly in contact with the descending reaction mixture. The solution of nitrate produced may be continuously withdrawn from the bottom of the tower.

I have further discovered that by employing pressures in excess of atmospheric for the treatment of mixtures of nitric acid and of an alkali metal or alkaline earth metal chloride, such as sodium chloride, the temperatures of operation may be increased and a more complete conversion of the sodium chloride obtained. Thus, for example, by operating reaction vessels 1 and 2, stripper 3, and boiler 4 under a pressure of 5 atmospheres, with the corresponding increases in temperature due to the higher boiling point of the solution in boiler 4, despite the resulting increase in the partial pressures of nitrosyl chloride and chlorine in the gas phase in contact with the reacting materials, which it would be expected would make the reaction less complete than when operating at ordinary pressure, it has been found that an overall beneficial effect in giving a more complete conversion of the chloride in the liquor in stripper 3 and boiler 4 is obtained.

In the above example the solution from boiler 4 contains about 8% free nitric acid, which is about one-fifth of the nitric acid originally used in making up the reaction mixture. This free acid is neutralized with sodium carbonate in neutralizer 5. If desired, somewhat more nitric acid than corresponds to 250 parts of 50% acid to 70 parts sodium chloride may be employed in making up the mixture introduced into reaction vessel 1, and the liquor leaving stripper 3 may then contain a somewhat higher proportion of free nitric acid than that stated above. By operating in this manner, the concentration of undecomposed sodium chloride in the liquor leaving the stripper may be lowered, although such a modification of the example involves the use of somewhat more sodium carbonate when the nitric acid in solution is to be neutralized before evaporating the solution for the recovery of solid sodium nitrate.

Instead of passing steam from boiler 4 and stripper 3 in direct contact with the reaction mixture in vessels 2 and 1, the steam, containing minor quantities of nitrosyl chloride and chlorine, may be passed in indirect heat exchange relationship with the solution in these reaction vessels. While this mode of operating has the advantage of preventing dilution of the reaction mixture with the condensed steam, it does give a condensate containing nitric and hydrochloric acid highly diluted with water which it is uneconomical to treat for the recovery of the acids, and further, this method of heating the reaction mixture is not as satisfactory both from the viewpoint of the cost of equipment required and the heat transfer efficiency as the method employing direct contact.

The solutions and gases to be handled in carrying out the reaction between nitric acid and alkali metal or alkaline earth metal chloride are at best highly corrosive. It has been found, however, that an alloy containing about 28% chromium, the balance principally iron, has a satisfactory resistance for it to be used in making the vessels and other parts of the apparatus exposed to attack by the solutions and gases involved in the reaction. Nitric acid solutions containing hydrochloric acid and sodium nitrate, however, in contact with apparatus made of this chromium-iron alloy should contain more than about 1 mol of nitric acid for every mol of hydrochloric acid. While the solutions involved in the above described process contain the nitric acid and hydrochloric acid in the above ratio, if the gases evolved (primarily mixtures of nitrosyl chloride and chlorine in equal molecular proportions and water vapor) are cooled to a sufficiently low temperature to condense out a solution of the reaction products of nitrosyl chloride and chlorine with water, such a solution would not contain the above ratio of nitric and hydrochloric acids, and the above mentioned chrome-iron alloy containing 28% chromium would be corroded. However, this corrosion may be prevented by having sufficient nitric acid present wherever condensate forms from the gases so that the condensed liquid contains more than about 1 mol of nitric acid for every 1 mol of hydrochloric acid. Where the solutions contain but a small amount of sodium chloride as is usually the case for the solution in boiler 4 of Fig. 1 of the drawing, it has been found that a chrome-iron alloy containing 18% chromium or more is resistant to corrosion by these solutions, and accordingly, such an alloy may be employed for the construction of boiler 4, although the alloys containing a higher percentage of chromium (28%) should be employed for stripper 3, reaction vessels 1 and 2 and the piping connecting these elements of the apparatus.

The process of this invention is particularly advantageous from the viewpoint of corrosion of the vessels employed. Thus, the relatively low temperature and high nitric acid content of the reaction mixture in the first vessel or in the top of a single vessel when this is used for carrying out the reaction, tends to reduce the rate of corrosion in this portion of the apparatus. Again, by boiling the nitrate solution after substantial completion of the reaction between the nitric acid and the chloride and stripping the reaction mixture of the gaseous products of the reaction by passing the steam evolved from the nitrate solution and the gaseous reaction produces themselves in contact with the reaction mixture, a low content of chloride ion is maintained in the hot solutions in the boiler and stripper shown in Fig. 1 of the drawing or in the bottom of a single reaction vessel when this is used. This markedly decreases the corrosion of this portion of the apparatus. The use as a material of construction of chrome-iron alloys for apparatus in which the alloy is contacted with solutions of nitric acid and hydrochloric acid disclosed in this specification is claimed in my copending application Serial No. 214,908, filed June 21, 1938.

The process described in this specification in which a reaction mixture prepared from a metal chloride and aqueous nitric acid of 55% or higher strength is heated to its boiling point to react the chloride and acid with the evolution of a mixture of nitrosyl chloride and chlorine and the gases evolved by the reaction are passed in direct contact with an aqueous liquid containing nitric acid of a concentration corresponding to 30% or stronger nitric acid at a temperature below the boiling point of that liquid to cool and condense water vapor from the gases, is claimed in my copending application Serial No. 143,245, filed May 18, 1937. That process using as the aqueous liquid containing nitric acid the incoming reaction mixture of metal chloride and nitric acid is claimed in my copending application Serial No. 143,246, filed May 18, 1937.

I claim:

1. In a process wherein a chloride and nitric acid are reacted to form a nitrate, chlorine and nitrosyl chloride that improvement which comprises heating a reaction mixture of nitric acid and a chloride of a metal from the group consisting of the alkali and the alkaline earth metals in a series of stages at increasing temperatures in successive stages up to a temperature at which said reaction mixture boils under a pressure substantially above atmospheric pressure in at least one of said stages, continuing to heat the reaction mixture in said stages until said chloride is decomposed to form nitrate, chlorine and nitrosyl chloride and the resulting solution contains but a small amount of residual undecomposed chloride, then boiling the resulting solution under said pressure above atmospheric, and passing the steam evolved from the boiling solution together with the gases evolved from a stage of said series of stages in direct contact with the reaction mixture in a preceding stage of said series to heat the reaction mixture to the aforesaid temperatures.

2. In a process wherein a chloride and nitric acid are reacted to form a nitrate, chlorine and nitrosyl chloride that improvements which comprises heating an aqueous reaction mixture of nitric acid and a chloride of a metal from the group consisting of the alkali and the alkaline earth metals under a pressure substantially above atmospheric pressure to a temperature at which said reaction mixture boils under said pressure and said chloride is decomposed with the formation of nitrate chlorine and nitrosyl chloride, and withdrawing from contact with the reaction mixture heated at said temperature the nitrosyl chloride and chlorine evolved therefrom.

3. The process for the production of a nitrate which comprises mixing nitric acid and a chloride of a metal from the group consisting of the alkali and the alkaline earth metals, heating the mixture to promote reaction of said nitric acid and chloride to form the corresponding nitrate, introducing into the reaction mixture nitrate of the metal of said chloride in amount sufficient to substantially saturate the reaction mixture with said nitrate at a temperature of about 100° C. to 115° C., and heating the mixture after the introduction of the nitrate at a temperature at which the nitric acid and chloride react to form nitrate.

4. The process for the production of a nitrate which comprises mixing nitric acid and a chloride of a metal from the group consisting of the alkali and the alkaline earth metals, heating the mixture to promote reaction of said nitric acid and chloride to form the corresponding nitrate, introducing into the reaction mixture solid nitrate of the metal of said chloride and after the introduction of the solid nitrate heating the mixture at a temperature promoting the reaction of the chloride and nitric acid to form nitrate.

5. In a process wherein sodium chloride and nitric acid are reacted to form sodium nitrate, chlorine and nitrosyl chloride that improvement which comprises heating an aqueous reaction mixture of nitric acid and sodium chloride under pressure substantially above atmospheric pressure to a temperature at which said reaction mixture boils under said pressure and said chloride is decomposed with the formation of sodium nitrate, chlorine and nitrosyl chloride, and withdrawing from contact with the reaction mixture heated at said temperature the nitrosyl chloride and chlorine evolved therefrom.

6. In a process wherein sodium chloride and nitric acid are reacted to form sodium nitrate, chlorine and nitrosyl chloride that improvement which comprises boiling under a pressure substantially above atmospheric an aqueous reaction mixture originally containing nitric acid of a concentration above about 40% HNO3 and sodium chloride and continuing said boiling of the reaction mixture until its nitric acid content is not greater than that corresponding to about a 7-N solution and said chloride is decomposed with the formation of sodium nitrate, chlorine and nitrosyl chloride and withdrawing from contact with the boiling reaction mixture the nitrosyl chloride and chlorine evolved therefrom.

7. The process for the production of sodium nitrate by the reaction of sodium chloride and nitric acid to form sodium nitrate, chlorine and nitrosyl chloride which comprises successively passing a reaction mixture having an original composition corresponding to a mixture of about 70 parts of sodium chloride and about 250 parts of 50% nitric acid through a plurality of reaction stages, maintaining the reaction mixture in the first, second and third of said stages at temperatures of about 60° C., 100° C. and 115° C., respectively, until said chloride is decomposed to form sodium nitrate, chlorine and nitrosyl chloride and the resulting solution contains but a small amount of residual undecomposed chloride, boiling the resulting solution, and passing the steam driven off from the boiling solution in direct contact with the reaction mixtures in the aforesaid stages until in the last of said stages the solution is substantially freed of gaseous products of the reaction.

8. The process for the production of sodium nitrate which comprises mixing nitric acid and sodium chloride, heating the mixture to promote reaction of said nitric acid and sodium chloride to form sodium nitrate, introducing into the reaction mixture sodium nitrate in amount sufficient to substantially saturate the reaction mixture with sodium nitrate at a temperature of about 100° C. to 115° C. and heating the mixture after the introduction of said sodium nitrate at a temperature at which the nitric acid and sodium chloride react to form sodium nitrate.

9. The process for the production of sodium nitrate which comprises mixing aqueous nitric acid and sodium chloride, heating the reaction mixture thus prepared to a temperature at which the nitric acid and sodium chloride react to form sodium nitrate in aqueous solution containing undecomposed sodium chloride in amount such that upon evaporation of the solution sodium nitrate first crystallizes out, separately recovering solid sodium nitrate and sodium chloride from said solution by evaporating the solution at one pressure and then at a higher pressure, continuing the evaporation at the lower pressure to crystallize solid sodium nitrate from the solution until the concentration of sodium chloride in the solution approaches saturation for the temperature at which the solution is heated, separating the crystallized sodium nitrate from the solution, then heating the solution under the higher pressure to evaporate additional water therefrom and crystallize out sodium chloride until the concentration of sodium nitrate in the solution approaches saturation for the temperature at which the solution is heated under the higher pressure, separating the crystallized sodium chloride from the thus concentrated solution and mixing the sodium chloride thus recovered with aqueous nitric acid in the preparation of additional quantities of the aforesaid reaction mixture.

10. In a process wherein a chloride and nitric acid are reacted to form a nitrate, chlorine and nitrosyl chloride, that improvement which comprises heating a reaction mixture of aqueous nitric acid and a chloride of a metal from the group consisting of the alkali and alkaline earth metals at increasing temperatures up to a temperature above 100° C. at which said mixture boils, continuing the heating of the reaction mixture until said chloride is decomposed to form nitrate, chlorine and nitrosyl chloride and the resulting solution contains but a small amount of residual undecomposed chloride and then boiling said solution, passing the steam thus evolved in direct contact with said reaction mixture, the steam being passed in contact with the reaction mixture while it is being heated up to its boiling point, and continuing the boiling of said solution and passage of the steam thus obtained in direct contact with the reaction mixture until, of the total heat supplied to the reaction mixture, all that which is imparted thereto at temperatures of about 100° C. and higher is supplied by the steam evolved by boiling said solution and the chloride in the reaction mixture is substantially completely decomposed.

11. In a process wherein a chloride and nitric acid are reacted to form a nitrate, chlorine and nitrosyl chloride, that improvement which comprises heating a reaction mixture of aqueous nitric acid and sodium chloride at increasing temperatures up to a temperature above 100° C. at which said mixture boils, continuing the heating of the reaction mixture until said chloride is decomposed to form sodium nitrate, chlorine and nitrosyl chloride and the resulting solution contains but a small amount of residual undecomposed chloride and then boiling said solution, passing the steam thus evolved in direct contact with said reaction mixture, the steam being passed in contact with the reaction mixture while it is being heated up to its boiling point, and continuing the boiling of said solution and passage of the steam thus obtained in direct contact with the reaction mixture until, of the total heat supplied to the reaction mixture, all that which is imparted thereto at temperatures of about 100° C. and higher is supplied by the steam evolved by boiling said solution and the chloride in the reaction mixture is substantially completely decomposed.

12. In a process wherein a chloride and nitric acid are reacted to form a nitrate, chlorine and nitrosyl chloride, that improvement which comprises heating an aqueous reaction mixture of nitric acid and a chloride of a metal from the group consisting of the alkali and the alkaline earth metals under a pressure of at least five atmospheres to a temperature at which said reaction mixture boils under said pressure and said chloride is decomposed with the formation of nitrate, clorine and nitrosyl chloride, and withdrawing from contact with the reaction mixture heated at said temperature the nitrosyl chloride and chlorine evolved therefrom.

13. In a process wherein a chloride and nitric acid are reacted to form a nitrate, chlorine and nitrosyl chloride, that improvement which comprises heating a reaction mixture of nitric acid and a chloride of a metal from the group consisting of the alkali and the alkaline earth metals in a series of stages at increasing temperatures in successive stages up to a temperature at which said reaction mixture boils under a pressure of at least five atmospheres in at least one of said stages, continuing to heat the reaction mixture in said stages until said chloride is decomposed to form nitrate, chlorine and nitrosyl chloride and the resulting solution contains but a small amount of residual undecomposed chloride, then boiling the resulting solution under said pressure above atmospheric, and passing the steam evolved from the boiling solution together with the gases evolved from a stage of said series of stages in direct contact with the reaction mixture in a preceding stage of said series to heat the reaction mixture to the aforesaid temperatures.

14. In a process wherein sodium chloride and nitric acid are reacted to form sodium nitrate, chlorine and nitrosyl chloride, that improvement which comprises heating an aqueous reaction mixture of nitric acid and sodium chloride under a pressure of at least five atmospheres to a temperature at which said reaction mixture boils under said pressure and said chloride is decomposed with the formation of sodium nitrate, chlorine and nitrosyl chloride, and withdrawing from contact with the reaction mixture heated at said temperature the nitrosyl chloride and chlorine evolved therefrom.

15. In a process wherein sodium chloride and nitric acid are reacted to form sodium nitrate, chlorine and nitrosyl chloride, that improvement which comprises boiling under a pressure of five atmospheres an aqueous reaction mixture originally containing nitric acid of a concentration above about 40% $HNO_3$ and sodium chloride and continuing said boiling of the reaction mixture until its nitric acid content is not greater than that corresponding to about a 7-N solution and said chloride is decomposed with the formation of sodium nitrate, chlorine and nitrosyl chloride, and withdrawing from contact with the boiling reaction mixture the nitrosyl chloride and chlorine evolved therefrom.

16. In a process wherein a chloride and nitric acid are reacted to form a nitrate, chlorine and nitrosyl chloride, that improvement which comprises mixing aqueous nitric acid and a chloride of a metal of the group consisting of the alkali and alkaline earth metals in the proportions forming a reaction mixture containing nitric acid of a concentration above about 40% $HNO_3$ and an excess of said chloride, heating said reaction mixture in a plurality of reaction stages in which the mixture is heated at increasing temperatures up to a temperature above 100° C. at which the mixture boils, continuing the heating of the reaction mixture until said chloride is substantially completely decomposed with the formation of nitrate, chlorine and nitrosyl chloride and the resulting solution contains but a small amount of residual undecomposed chloride, then boiling said solution, passing the steam thus evolved in direct contact with said reaction mixture in the aforesaid plurality of reaction stages and continuing the boiling of said solution and passage of the steam thus obtained in direct contact with the reaction mixture until, of the total heat supplied to the reaction mixture, all that which is imparted thereto at temperatures of about 100° C. and higher is supplied by the steam evolved by boiling said solution and the chloride in the reaction mixture is substantially completely decomposed.

17. In a process wherein a chloride and nitric acid are reacted to form a nitrate, chlorine and nitrosyl chloride, that improvement which comprises mixing aqueous nitric acid and sodium chloride in the proportions forming a reaction mixture containing nitric acid of a concentration above about 40% $HNO_3$ and an excess of said chloride, heating said reaction mixture in a plurality of reaction stages in which the mixture is heated at increasing temperatures up to a temperature above 100° C. at which the mixture boils, continuing the heating of the reaction mixture until said chloride is substantially completely decomposed with the formation of nitrate, chlorine and nitrosyl chloride and the resulting solution contains but a small amount of residual undecomposed chloride, then boiling said solution, passing the steam thus evolved in direct contact with said reaction mixture in the aforesaid plurality of reaction stages and continuing the boiling of said solution and passage of the steam thus obtained in direct contact with the reaction mixture until, of the total heat supplied to the reaction mixture, all that which is imparted thereto at temperatures of about 100° C. and higher is supplied by the steam evolved by boiling said solution and the chloride in the reaction mixture is substantially completely decomposed.

18. The process for the production of a nitrate which comprises mixing nitric acid and sodium chloride, heating the mixture to promote reaction of said nitric acid and chloride to form sodium nitrate, introducing into the reaction mixture solid sodium nitrate and after the introduction of the solid nitrate heating the mixture at a temperature promoting the reaction of the cloride and nitric acid to form nitrate.

19. The process for the production of an alkali metal nitrate which comprises mixing aqueous nitric acid and an alkali metal chloride, heating the reaction mixture thus prepared to a temperature at which the nitric acid and chloride react to form alkali metal nitrate in aqueous solution containing undecomposed alkali metal chloride in amount such that upon evaporation of the solution alkali metal nitrate first crystallizes out, separately recovering solid alkali metal nitrate and chloride from said solution by evaporating the solution at one pressure and then at a higher pressure, continuing the evaporation at the lower pressure to crystallize solid alkali metal nitrate from the solution until the concentration of alkali metal chloride in the solution approaches saturation for the temperature at which the solution is heated, separating the crystallized alkali metal nitrate from the solution, then heating the solution under the higher pressure to evaporate additional water therefrom and to crystallize out alkali metal chloride until the concentration of alkali metal nitrate in the solution approaches saturation for the temperature at which the solution is heated under the higher pressure and separating the crystallized alkali metal chloride from the thus concentrated solution and mixing the alkali metal chloride thus recovered with aqueous nitric acid in the preparation of additional quantities of the aforesaid reaction mixture.

HERMAN ALBERT BEEKHUIS, Jr.